Patented Oct. 19, 1926.

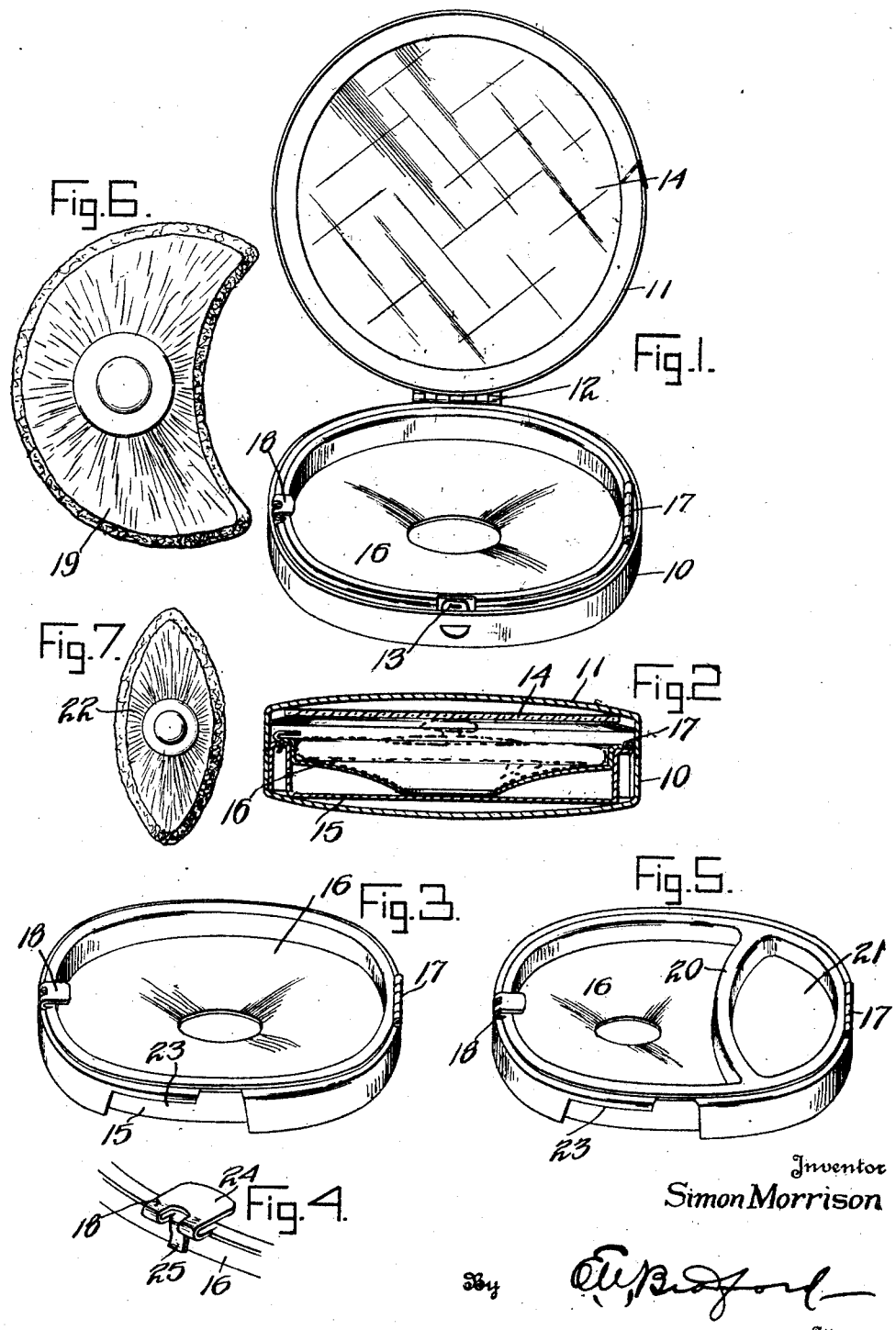

1,604,066

UNITED STATES PATENT OFFICE.

SIMON MORRISON, OF BROOKLYN, NEW YORK.

VANITY CASE.

Application filed July 25, 1925. Serial No. 46,090.

My said invention relates to an improved form of vanity case whereby such a device is provided of a very compact and comparatively inexpensive construction and one which at the same time comprises all features required for convenient use thereof, all as will be hereinafter more fully described.

Referring to the accompanying drawings which are made a part hereof and on which similar reference characters indicate similar parts, Figure 1 is a perspective view of a vanity case of my improved construction showing the lid of the outside casing open, Figure 2, a sectional view through the device with the lid closed, Figure 3, a perspective view of the inner or powder containing casing closed, Figure 4, a detail view of the means for holding said inner casing closed, Figure 5, a view similar to Figure 3 showing a modified form, and Figures 6 and 7, views indicating powder-puffs for use with the device.

Said device is preferably of metal the parts being pressed or otherwise formed as required for the purpose. The outer casing consists of a lower box-like part 10 having a lid 11 connected thereto by a hinge 12 and adapted to be secured when closed by a spring catch 13 diametrically opposite said hinge.

The interior surface of the lid is preferably provided with a mirror 14 as indicated.

The inner casing or powder container consists of a lower or main box-like member 15 adapted to fit within casing 10 and having a lid or top portion 16 connected thereto by by a hinge 17 and adapted to be secured in closed position by a spring clip 18 at the opposite side thereof. Said top or lid 16 is formed cup-shaped on its upper side to contain a powder-puff, as 19, and preferably has an aperture normally beneath said powder-puff as shown. In the modification shown in Fig. 5 the construction is identical with that shown in the main figures of the drawing except the lid or top 16 of the powder container is formed with a partition 20 dividing its top into two compartments, one of which is designed to hold the powder-puff and the other, 21, rouge or the like with another puff, as 22, thereon.

The top edge of the powder container 15 is preferably formed with a turned over depending flange adapted to fit within the box 10 and be retained through frictional contact, said flange having cut away portions as at 23 permitting slight compression of the resilient material of which it is composed, thus providing for the tight insertion of the powder container within the outside casing while at the same time providing for its retention in position. The clip 18 preferably consists of an ear 24 by which the user may lift the lid and with an outwardly curved spring tongue 25 adapted to fit in a perforation in the top of the rim of the box and engage therewith for holding the parts closed.

By this arrangement a very compact but, at the same time, complete device for the purpose is provided.

In use, the powder is placed in the container 15 and the lid 16 is closed which prevents the powder from escaping except through the central perforation where a thin film of the powder is exposed for contact with the powder-puff as indicated.

It will be understood, of course, that if preferred the lid 16 of the powder container may be imperforate, in which case the user would lift the lid when desiring access to the powder. Also that a rouge compartment, such as 21, may be supplied and other modifications made in the details of construction without departing from the spirit of my invention as defined in the claims.

Having thus fully described my said invention, what I claim as new and desire to secure by Letters Patent is:

1. A vanity case comprising a receptacle for loose powder which receptacle is provided with a lid, said lid being formed with a recess to receive a powder-puff and a separate recess to contain rouge or the like, and a separate outside receptacle within which said powder receptacle is adapted to fit also provided with a closure adapted to enclose the powder receptacle and powder-puff, said lid being provided with a mirror on its interior surface, substantially as set forth.

2. A vanity case comprising a box, a cover for the box, a receptacle for loose powder in said box having a depending portion frictionally engaging the box and cover and serving to maintain them in abutting end-to-end relation, a cover for said powder receptacle hinged at one side thereof having a catch extending through the depending rim said covering terminating in an opening in close proximity with the bottom of the receptacle whereby a thin film of powder is exposed through said opening, substantially as set forth.

3. A vanity case comprising a box, a cover for the box, a receptacle for loose powder in said box having a depending portion frictionally engaging the box and cover and serving to maintain them in abutting end-to-end relation, a cover for said powder receptacle hinged at one side thereof having a catch extending through the depending rim said covering terminating in an opening in close proximity with the bottom of the receptacle whereby a thin film of powder is exposed through said opening said depending rim being cut away at one side for increasing the flexibility thereof and for accommodating the catch on the box and lid, substantially as set forth.

4. A vanity case comprising a box having a bottom and a top hingedly connected thereto, a receptacle for powder disposed within said box said receptacle having its rim extending outwardly and downwardly for resiliently engaging the box and cover and serving to maintain them in abutting end-to-end relation, a cover for said receptacle hinged at one side thereof provided with a catch at its opposite side adapted to extend through the upper portion of said rim said cover being curved downwardly from the upper end of the receptacle and terminating in an opening in close proximity to the bottom of the receptacle so that a thin film of powder is exposed in said opening and forming a support for a powder puff on top of said cover within said box, substantially as set forth.

5. A vanity case comprising a box, a cover for said box, a receptacle for loose powder within said box said receptacle having a portion extending outwardly and downwardly from said upper end and forming a rim for engaging the inside of the box and lid for holding them in end-to-end relation, and a cover for said loose powder receptacle sloping down from its marginal portion toward its center having an opening terminating in close proximity with the bottom of the box through which a thin film of powder is exposed, and a partition across said lid forming a pair of compartments for the reception of powder puffs, substantially as set forth.

In witness whereof, I have hereunto set my hand at Washington, District of Columbia, this 24th day of July, A. D. nineteen hundred and twenty-five.

SIMON MORRISON.